Patented Aug. 18, 1925.

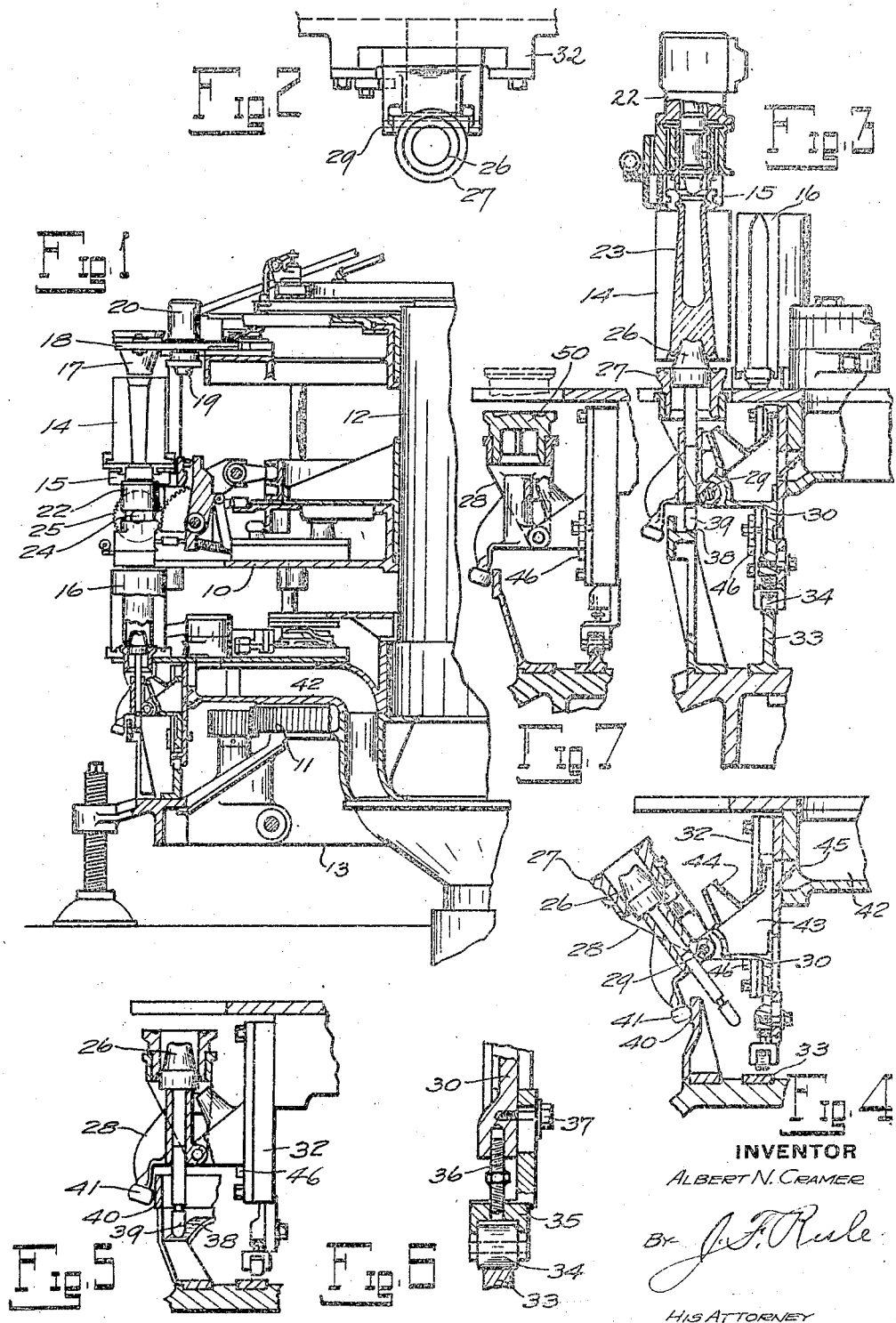

1,550,152

UNITED STATES PATENT OFFICE.

ALBERT N. CRAMER, OF TOLEDO, OHIO, ASSIGNOR TO THE OWENS BOTTLE COMPANY, OF TOLEDO, OHIO, A CORPORATION OF OHIO.

GLASS-FORMING MACHINE.

Application filed March 16, 1922. Serial No. 544,113.

*To all whom it may concern:*

Be it known that I, ALBERT N. CRAMER, a citizen of the United States, residing at Toledo, in the county of Lucas and State of Ohio, have invented new and useful Improvements in Glass-Forming Machines, of which the following is a specification.

My invention relates to improvements in glass forming machines, and particularly to the molds in which the glass is shaped and the mechanism for manipulating and controlling the mold bottoms and associated parts. The invention is shown in connection with a glass blowing machine having a number of units each embodying a set of molds and their actuating mechanisms and accessories.

An object of the invention is to provide a practical form of mold bottom and actuating mechanism therefor which will permit the use of finishing molds of different lengths to be used simultaneously, so that bottles or other articles of different lengths may be manufactured at the same time on the machine.

A further object of the invention is to provide a mold bottom and operating means therefor by which the glass blank is under complete control during the transfer of the blank from the blank mold to the finishing mold.

Other objects of the invention will appear hereinafter.

In the accompanying drawings:

Figure 1 is a fragmentary sectional elevation of a machine embodying my invention.

Figure 2 is a plan view of a mold bottom and its support.

Figure 3 is a sectional elevation showing a set of molds, the mold bottom and its actuating mechanism.

Figure 4 is a view showing the mold bottom tilted to discharge a bottle.

Figure 5 is a similar view, but with the mold bottom in upright position.

Figure 6 is a fragmentary view showing means for adjusting the height of the mold bottom.

Figure 7 is a view similar to Figure 5, but showing a different form of mold bottom.

The invention is herein shown in connection with the form of machine disclosed in the co-pending application of Richard La France, Serial Number 532,606, filed January 30, 1922.

The machine comprises a mold carriage 10 driven by gearing 11 to rotate continuously about a central stationary column 12 rising from a base 13, said column supporting stationary cams by which the various operations of the molds are controlled. Mounted on the mold carriage to rotate therewith are a number of groups of molds each comprising a blank mold 14, neck mold 15 and finishing mold 16. Associated with each blank mold is a funnel guide 17 carried on a radially slidable support 18 which also carries a blowing head 19. After a charge of glass is dropped through the funnel 17 into the blank mold, the support 18 is moved radially outward to bring the head 19 over the mold. Said head is then lowered by an air motor 20 to close the receiving end of the blank mold, and air pressure supplied through the head 19 to compact the glass in the blank and neck molds and form the neck of the bottle.

The neck mold is supported on an inverting head 22 through which air is supplied to blow the parison 23 to the hollow form shown in Figure 3. The head 22 is then rotated about a horizontal axis 24 by means of cam actuated gearing 25 to swing the neck mold and blank mold downward as a unit to the inverted position (Fig. ?). After this, the blank mold 14 is opened and swung upward independently of the neck mold, leaving the bare blank depending from the neck mold. The sectional finishing mold 16 then closes about the parison which is blown to its finished form in the mold.

The finishing mold bottom when designed for making bottles with reentrant bottoms comprises an inner central section 26 and an outer annular section 27, both removably mounted in a tiltable bracket arm or support 28. The arm 28 is connected by a pivot 29 to a frame 30 mounted to move up and down in vertical guides 32 on the mold carriage. The vertical movements of the mold bottom frame 30 are controlled by a stationary cam 33 on which runs a roll 34 mounted in a yoke 35 attached to the frame 30. This yoke is adjustable up and down relatively to the frame 30 to adjust the height of the mold bottom. Such adjustment is effected by means of an adjusting rod 36 having right and left hand screw threads engaging the frame 30 and yoke 35 respectively. The parts are held in adjusted position by a clamping bolt 37. The mold bottom section 26 is movable up and down relative to the annular section 27, such movement being controlled by a stationary cam 38 on which slides a stem 39 depending from the bottom section 26.

When the finishing mold is closed it surrounds and locks the mold bottom in its upright position. When the mold bottom is out of the control of the finishing mold its tilting movements are controlled by a stationary cam 40 on which runs a cam roll 41 carried by the arm 28.

Air for cooling the mold bottom is supplied through a channel 42 to an air chamber 43 on the frame 30, said chamber having a nozzle 44 through which air is directed against the mold bottom. The supply of air to the chamber 43 may be controlled by a valve 45. It will be noted that the air channel 42 is maintained in communication with the air chamber 43 at all times so that a continuous supply of cooling air may be directed against the mold bottom except during the brief interval of time the bottom is tilted to discharging position.

The operation of the mold bottom may be summed up as follows:

After the parison has been swung down to the Figure 3 position, the bottom section 26 may be projected upward by its cam 38 to engage the lower end of the parison before the blank mold opens, so that when the blank mold is opened the blank is supported by both neck mold and the bottom section 26 until the finishing mold has closed. After the finishing mold closes, the blank is blown to its finished form (Fig. 1). The bottom section 26 is then lowered to the Figure 5 position, so that it will not interfere with the discharge of the bottle. After the finishing mold opens, the frame 30 carrying the mold bottom moves vertically downward until arrested by a stop 46 on the mold carriage, the cam 33 being shaped to permit this downward movement. After the mold bottom with the finished article thereon is thus lowered, the arm 28 with the mold bottom is tilted about the pivot 29, the cam 40 being shaped to permit this tilting, and the bottle drops by gravity from the machine. The mold bottom is then immediately returned to its upright position.

It will be noted that the mold bottom when arrested by the stop 46 is always in the same position regardless of the adjustment of the roll 34, so that the articles are always discharged from the same level regardless of the adjustment for different lengths of molds. This arrangement makes it practical to manufacture a number of bottles or other articles of different lengths or sizes at one time on the same machine. The bottom plate is under complete control of the cams at all times when not under the control of the finishing mold, so that a smooth action of the various parts is insured.

Figure 7 shows a modification in which a bottom plate 50 is made in a single piece removably supported in the arm 28. This form of bottom plate is used in making bottles or other articles having flat or approximately flat bottoms. The construction and operation may be substantially as above described in connection with the other views, except that the movable section 26 with its operating mechanism are omitted.

Modifications may be resorted to within the spirit and scope of my invention.

What I claim is:

1. In an automatic bottle blowing machine, a finishing mold comprising laterally swinging body sections, a vertically swinging bottom section comprising a central reentrant bottom member movable vertically in said bottom section while the latter is in horizontal position, and means to move said bottom section vertically while held in horizontal position.

2. In a glass forming machine, the combination of laterally swinging mold sections, a mold bottom, a cam operative to move said bottom vertically into and out of position to close the lower end of the mold, said bottom being mounted for tilting movement, and a cam to control said movement.

3. In a glass forming machine, the combination of a mold comprising a body portion and a bottom movable vertically toward and from the body portion, a cam to control said movements, and a stop to limit the downward movement of the mold bottom independently of said cam.

4. In a glass forming machine, the combination of a rotating mold carriage, a mold thereon comprising a body portion and a mold bottom, a stationary cam operable to lift the mold bottom, adjusting means to vary the height to which the mold bottom is lifted by the cam, and a stop to limit the downward movement of the mold bottom and cause it to be arrested at the same lowered position independently of said adjustment.

5. In a glass forming machine, the combination of a rotating mold carriage, a mold thereon comprising a body portion and a mold bottom, and a stationary cam operable to lift the mold bottom by a straight line movement, said bottom being mounted for tilting movement to discharge an article supported thereon.

6. In a glass forming machine, the combination of a rotating mold carriage, a mold thereon comprising a body portion and a mold bottom, a stationary cam operable to lift the mold bottom, said bottom being mounted for tilting movement to discharge an article supported thereon, and a cam to control said tilting movement and cause such tilting movement to take place while the mold bottom is in its lowered position.

7. In a glass forming machine, the combination of a rotary carriage, finishing molds thereon, bottoms for said molds, frames carrying said bottoms and mounted for vertical reciprocating movement on the mold carriage, a stationary cam to control said vertical movements, said mold bottoms each being pivotally connected to its frame for tilting movement about a horizontal axis, and a cam controlling such tilting movements.

8. In a glass forming machine, the combination of a rotary carriage, finishing molds thereon, bottoms for said molds, frames carrying said bottoms and mounted for vertical reciprocating movement on the mold carriage, nozzles carried on said frames and arranged to direct cooling air against the mold bottoms, and means to supply air to said nozzles.

9. In a bottle forming machine, the combination of a blank mold, a finishing mold, a mold bottom of a size and shape to enter the charge receiving end of the blank mold, means to invert the blank mold with a charge of glass therein, means to move the mold bottom upward and cause it to enter the blank mold into position to engage the blank while the blank mold remains closed, means to then open the blank mold while said bottom is in supporting contact with the blank, and means to then close the finishing mold about the blank.

10. The method of forming a hollow glass article which comprises forming a blank of plastic glass in a blank mold, inverting the blank while retained in the mold, moving a mold bottom upward into supporting engagement with the blank while the latter is held by the blank mold, opening the blank mold while the blank is supported at its lower end by the mold bottom and at its upper end by a neck mold, enclosing the blank in a finishing mold while thus supported, and blowing it to hollow form in the finishing mold.

Signed at Toledo, in the county of Lucas and State of Ohio, this 11 day of March, 1922.

ALBERT N. CRAMER.